United States Patent
Bobo et al.

(10) Patent No.: US 9,777,875 B2
(45) Date of Patent: Oct. 3, 2017

(54) CLAM SHELL PUSH-TO-CONNECT ASSEMBLY

(71) Applicant: NIBCO Inc., Elkhart, IN (US)

(72) Inventors: David Bobo, Granger, IN (US); Derek Oldsen, Bristol, IN (US); James LaFortune, Elkhart, IN (US)

(73) Assignee: NIBCO INC., Elkhart, IN (US)

( * ) Notice: Subject to any disclaimer, the term of this patent is extended or adjusted under 35 U.S.C. 154(b) by 224 days.

(21) Appl. No.: 14/614,896

(22) Filed: Feb. 5, 2015

(65) Prior Publication Data

US 2015/0240980 A1    Aug. 27, 2015

Related U.S. Application Data

(60) Provisional application No. 61/944,792, filed on Feb. 26, 2014.

(51) Int. Cl.
  *F16L 19/06*    (2006.01)
  *F16L 37/091*   (2006.01)

(52) U.S. Cl.
  CPC .................... *F16L 37/091* (2013.01)

(58) Field of Classification Search
  USPC .................. 285/39, 419, 373, 340, 367, 337
  See application file for complete search history.

(56) References Cited

U.S. PATENT DOCUMENTS 2,201,372 A      5/1940  Miller
2,449,795 A *    9/1948  Stillwagon ............. F16L 17/04
                                                    285/104
2,484,192 A     10/1949  Squiller
2,491,004 A     12/1949  Graham
2,831,711 A      4/1958  Leadbetter
(Continued)

FOREIGN PATENT DOCUMENTS

DE     3443943 A1 *  6/1985  ............ F16L 17/032
EP     0528079       2/1993
(Continued)

OTHER PUBLICATIONS

Search Report and Written Opinion from PCT/US2015/017062 dated Jun. 4, 2015 (8 pages).
(Continued)

*Primary Examiner* — Aaron Dunwoody
(74) *Attorney, Agent, or Firm* — Price Heneveld LLP

(57) ABSTRACT

A plumbing fitting includes a housing defining a socket with an internal annular shoulder for sealably receiving a cartridge. A two-piece cylindrical cartridge has semi-cylindrical interlocking halves that lockably engage a grab ring positioned between the interlocking halves of the cartridge. The grab ring has inwardly projecting annularly spaced tines for gripping and holding a fluid conduit inserted into the housing and cartridge past the grab ring. The cartridge includes a ring seal positioned against the annular shoulder and internal wall of the socket for sealably coupling the cartridge to the socket and sealably coupling a fluid conduit to the cartridge. The cartridge may be held within the housing socket by a crimped-over end. Also, an integral release ring may be coupled to the cartridge, such that a separate tool is unnecessary to disconnect a fluid conduit from the fitting.

19 Claims, 5 Drawing Sheets

(56) References Cited

U.S. PATENT DOCUMENTS

| | | |
|---|---|---|
| 2,950,132 A | 8/1960 | Kocsuta |
| 3,204,988 A | 9/1965 | Ouderkirk et al. |
| 3,312,483 A | 4/1967 | Leadbetter et al. |
| 3,380,765 A | 4/1968 | Himmel |
| 3,603,619 A | 9/1971 | Bengesser et al. |
| 3,837,687 A | 9/1974 | Leonard |
| 3,874,709 A | 4/1975 | MacDonald |
| 3,884,508 A | 5/1975 | Jones |
| 3,909,046 A | 9/1975 | Legris |
| 3,920,270 A | 11/1975 | Babb, Jr. |
| 3,924,877 A | 12/1975 | Leopold, Jr. et al. |
| 4,043,576 A | 8/1977 | Reich et al. |
| 4,073,514 A | 2/1978 | Pate |
| 4,084,843 A | 4/1978 | Gassert |
| 4,123,090 A | 10/1978 | Kotsakis et al. |
| 4,138,146 A | 2/1979 | Rumble |
| 4,163,573 A | 8/1979 | Yano |
| 4,564,221 A | 1/1986 | Ishii |
| 4,586,734 A | 5/1986 | Grenier |
| 4,593,943 A | 6/1986 | Hama et al. |
| 4,613,172 A | 9/1986 | Schattmaier |
| 4,637,636 A | 1/1987 | Guest |
| 4,664,427 A | 5/1987 | Johnston |
| 4,747,626 A | 5/1988 | Hama et al. |
| 4,919,457 A | 4/1990 | Moretti |
| 4,993,755 A | 2/1991 | Johnston |
| 5,029,908 A | 7/1991 | Belisaire |
| 5,039,141 A | 8/1991 | Badoureaux |
| 5,096,235 A | 3/1992 | Oetiker |
| 5,108,134 A | 4/1992 | Irwin |
| 5,160,179 A | 11/1992 | Takagi |
| 5,328,215 A | 7/1994 | Grenier |
| 5,370,423 A | 12/1994 | Guest |
| 5,443,289 A | 8/1995 | Guest |
| 5,466,019 A | 11/1995 | Komolrochanaporn |
| 5,496,073 A | 3/1996 | Grenier |
| 5,511,830 A | 4/1996 | Olson et al. |
| 5,553,901 A | 9/1996 | Serot |
| 5,603,530 A | 2/1997 | Guest |
| 5,673,945 A | 10/1997 | Olson |
| 5,692,784 A * | 12/1997 | Hama ................ F16L 37/0915 285/105 |
| 5,769,462 A | 6/1998 | Angell |
| 5,813,705 A | 9/1998 | Dole |
| 5,885,450 A | 3/1999 | Reid |
| 5,911,443 A | 6/1999 | Le Quere |
| 6,056,326 A | 5/2000 | Guest |
| 6,065,779 A | 5/2000 | Moner et al. |
| 6,174,002 B1 | 1/2001 | Rho |
| 6,231,090 B1 | 5/2001 | Fukao et al. |
| 6,447,019 B1 | 9/2002 | Hosono et al. |
| 6,464,266 B1 | 10/2002 | O'Neill et al. |
| 6,517,124 B1 | 2/2003 | Le Quere |
| 6,641,178 B2 | 11/2003 | Gowing |
| 6,663,145 B1 | 12/2003 | Lyall, III et al. |
| 6,685,230 B1 | 2/2004 | Bottura |
| 6,880,865 B2 | 4/2005 | Guest |
| RE38,786 E | 8/2005 | Guest |
| 6,929,289 B1 | 8/2005 | Guest |
| 6,957,833 B2 | 10/2005 | Guest |
| 7,032,932 B2 | 4/2006 | Guest |
| 7,063,359 B2 | 6/2006 | Vallee |
| 7,100,948 B2 | 9/2006 | Guest |
| 7,121,593 B2 | 10/2006 | Snyder, Sr. et al. |
| 7,341,286 B2 | 3/2008 | Andre |
| 7,354,079 B2 | 4/2008 | Rehder et al. |
| 7,410,193 B2 | 8/2008 | Guest |
| 7,425,022 B2 | 9/2008 | Guest |
| 7,448,654 B2 | 11/2008 | Le Quere |
| 7,497,483 B2 | 3/2009 | Williams et al. |
| 7,533,907 B2 | 5/2009 | Swift et al. |
| 7,621,569 B2 | 11/2009 | Anthoine |
| 7,712,795 B2 * | 5/2010 | Vahlbrauk ............ F16L 21/065 285/340 |
| 7,862,089 B2 | 1/2011 | Crompton |
| 8,205,915 B1 | 6/2012 | Crompton et al. |
| 8,210,576 B2 | 7/2012 | Crompton |
| 8,398,122 B2 | 3/2013 | Crompton et al. |
| 8,480,134 B2 | 7/2013 | Crompton et al. |
| 8,608,205 B2 | 12/2013 | Lai |
| 2003/0057701 A1 | 3/2003 | Koo |
| 2004/0070198 A1 | 4/2004 | Rohrig |
| 2007/0075542 A1 | 4/2007 | Glaze et al. |
| 2009/0278346 A1 | 11/2009 | O'Brien |
| 2010/0171302 A1 | 7/2010 | Yoder |
| 2010/0253064 A1 | 10/2010 | Le Quere |
| 2010/0327576 A1 * | 12/2010 | Linhorst ................ F16L 25/12 285/38 |
| 2011/0088790 A1 | 4/2011 | Schutte et al. |
| 2011/0089684 A1 | 4/2011 | Schutte et al. |
| 2015/0159792 A1 | 6/2015 | Bobo et al. |
| 2015/0159794 A1 | 6/2015 | Bobo et al. |
| 2015/0240980 A1 | 8/2015 | Bobo et al. |

FOREIGN PATENT DOCUMENTS

| | | |
|---|---|---|
| FR | 2394736 | 1/1979 |
| FR | 2689205 | 10/1993 |
| GB | 1520742 | 8/1978 |
| GB | 2167147 | 5/1988 |

OTHER PUBLICATIONS 3 pages of photographs of prior art commercial fittings Jul. 14, 2008.

* cited by examiner

CLAM SHELL PUSH-TO-CONNECT ASSEMBLY

CROSS-REFERENCE TO RELATED APPLICATIONS

This application claims priority under 35 U.S.C. §119(e) and the benefit of U.S. Provisional Application No. 61/944,792 entitled CLAM SHELL PUSH-TO-CONNECT ASSEMBLY, filed on Feb. 26, 2014, by David Bobo, et al., the entire disclosure of which is incorporated herein by reference.

BACKGROUND OF THE INVENTION

The present invention relates to a push-to-connect plumbing fitting.

There have been numerous proposals for push-to-connect plumbing fittings which eliminate the need for additional labor steps in providing a connection of a fluid conduit to the fitting. With push-to-connect fittings, typically no soldering is necessary nor is crimping required to complete the seal between the fitting and a fluid conduit. One proposal for such a fitting is disclosed in U.S. Publication 2010/0171302 published on Jul. 8, 2010. Push-to-connect fittings may require a separate tool for the removal of a fluid conduit from the fitting once assembled. Some fittings integrally includes a release ring for such purpose. Nearly all of the push-to-connect fittings employ a grab ring made of a metal, such as stainless steel, with tines that extend inwardly and engage and hold a fluid conduit inserted into the fitting. Also, the fittings typically include at least one O-ring providing a fluid-tight seal for the connection.

Unfortunately, most of the push-to-connect fittings are relatively complicated to manufacture and require expensive tooled parts and/or forming processes to complete. As a result, they can become fairly expensive in an environment where competition is relatively vigorous.

SUMMARY OF THE INVENTION

A plumbing fitting made of a material that allows it to be formed includes a housing defining a socket with an internal annular shoulder for sealably receiving a cartridge. A two-piece cylindrical cartridge has semi-cylindrical interlocking halves that lockably engage a grab ring positioned between the interlocking halves of the cartridge. The grab ring has inwardly projecting annularly spaced tines for gripping and holding a fluid conduit inserted into the housing and cartridge past the grab ring. The cartridge includes a ring seal positioned against the annular shoulder and internal wall of the socket for sealably coupling the cartridge to the socket and sealably coupling a fluid conduit to the cartridge. In a one embodiment, the cartridge is held within the housing socket by a crimped-over end. In a preferred embodiment, an integral release ring is also coupled to the cartridge, such that a separate tool is unnecessary to disconnect a fluid conduit from the fitting.

These and other features, objects and advantages of the present invention will become apparent upon reading the following description thereof together with reference to the accompanying drawings.

DETAILED DESCRIPTION OF THE PREFERRED EMBODIMENT

Figure 1:
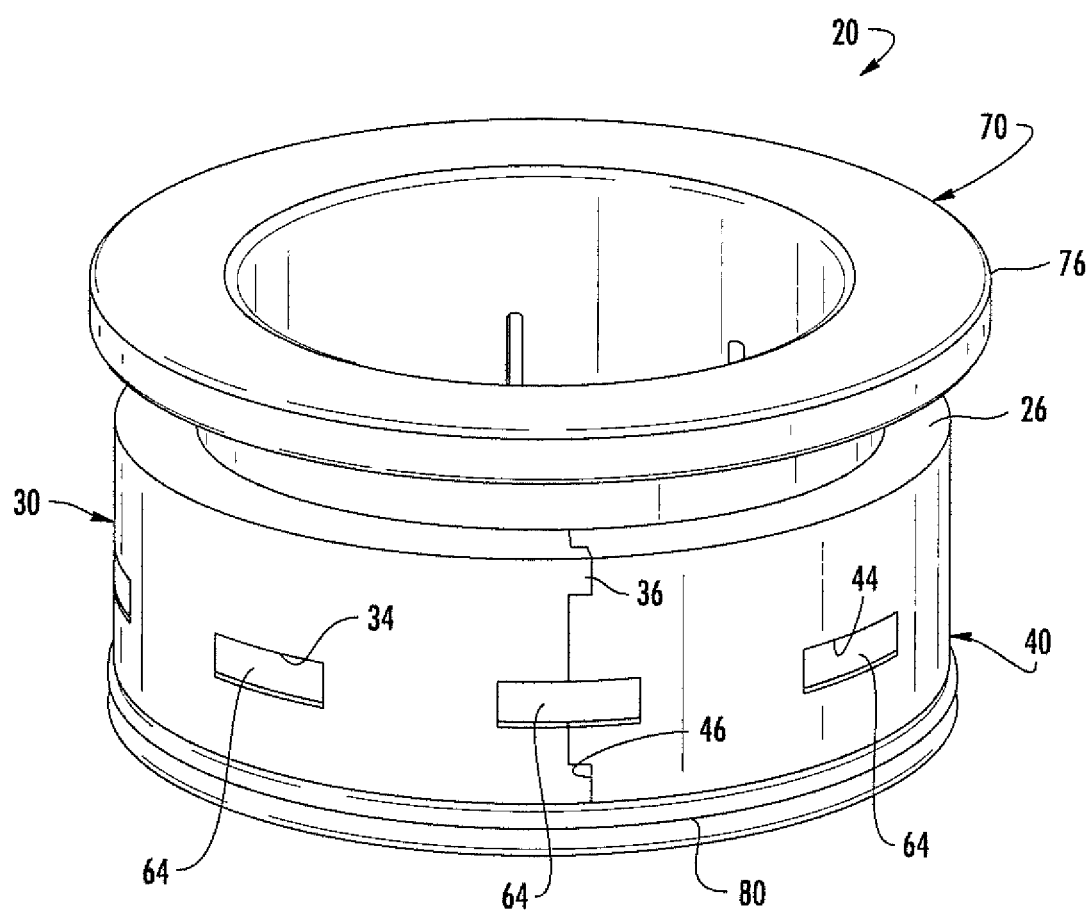
FIG. 1 is a perspective view of a cartridge embodying the push-to-connect structure.
Figure 2:
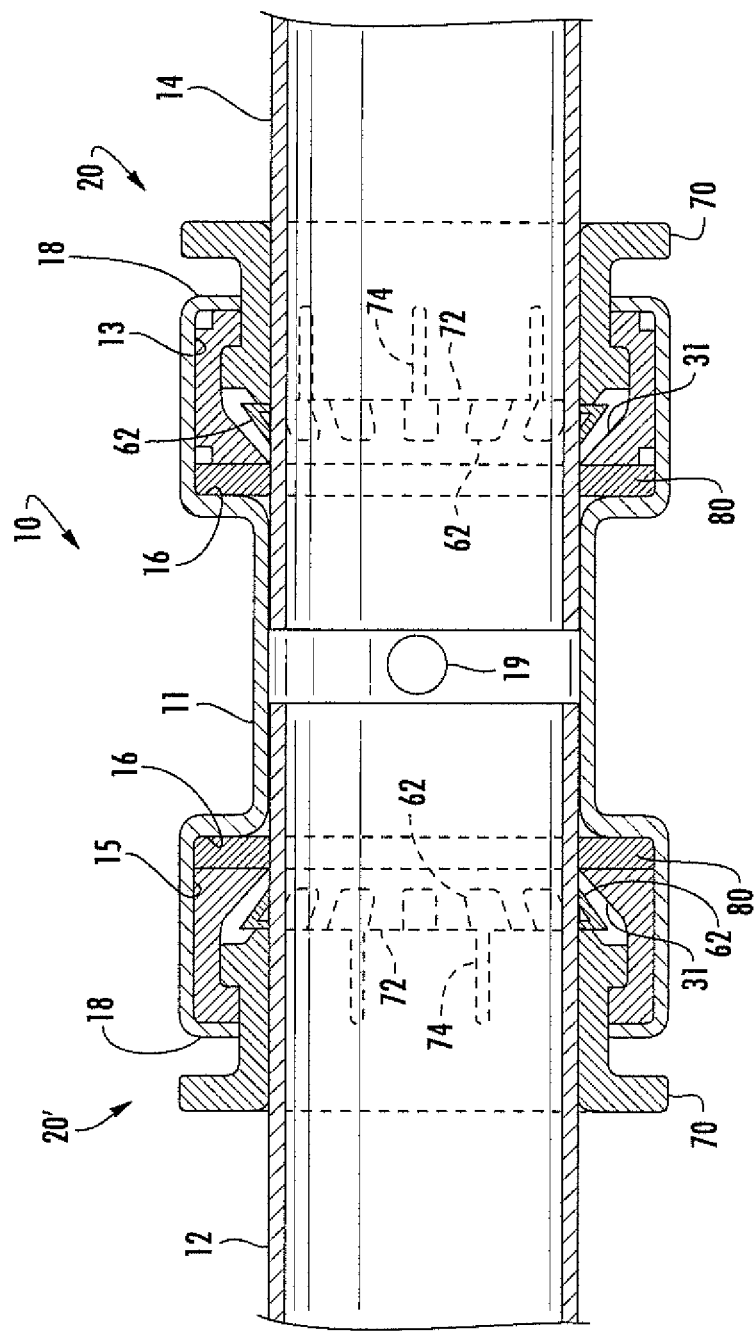
FIG. 2 is a cross-sectional view of a plumbing fitting showing the connection of fluid conduits at opposite ends of a coupling using two cartridges of FIG. 1 at opposite ends.
Figure 3:
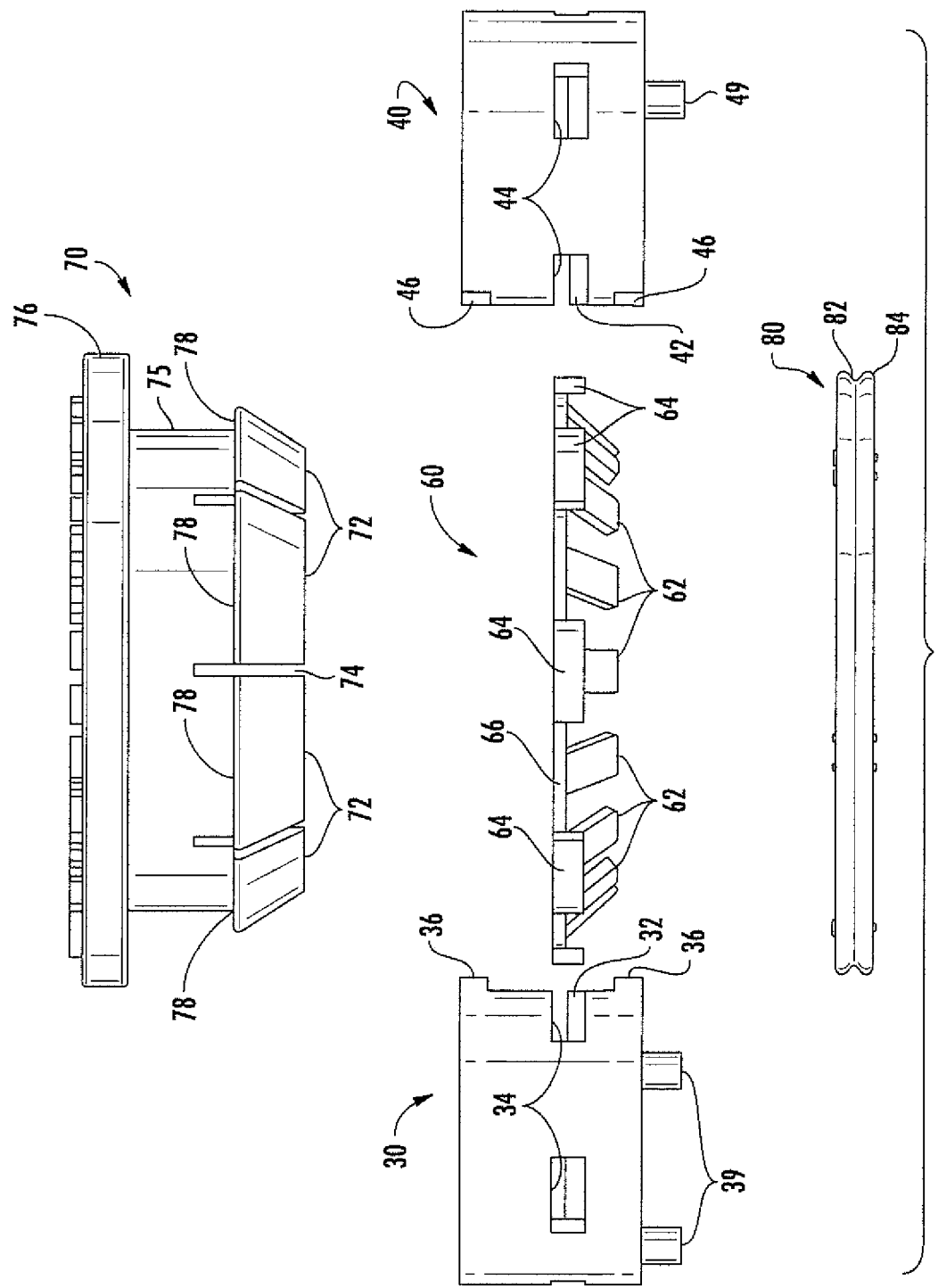
FIG. 3 is an enlarged exploded side elevational view of the components of the cartridge shown in FIG. 1.
Figure 4:
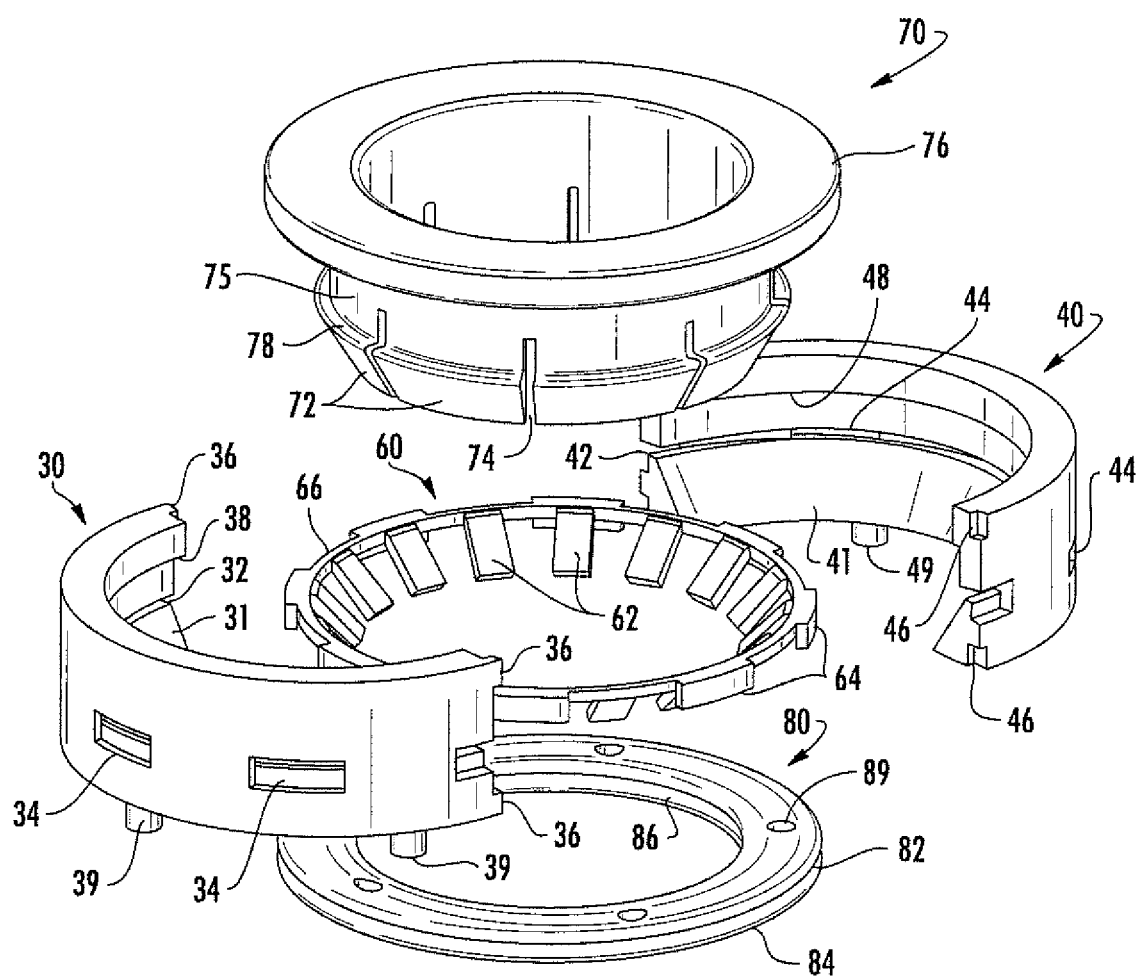
FIG. 4 is an exploded perspective view of the components of the cartridge shown in FIGS. 1 and 3.
Figure 5:
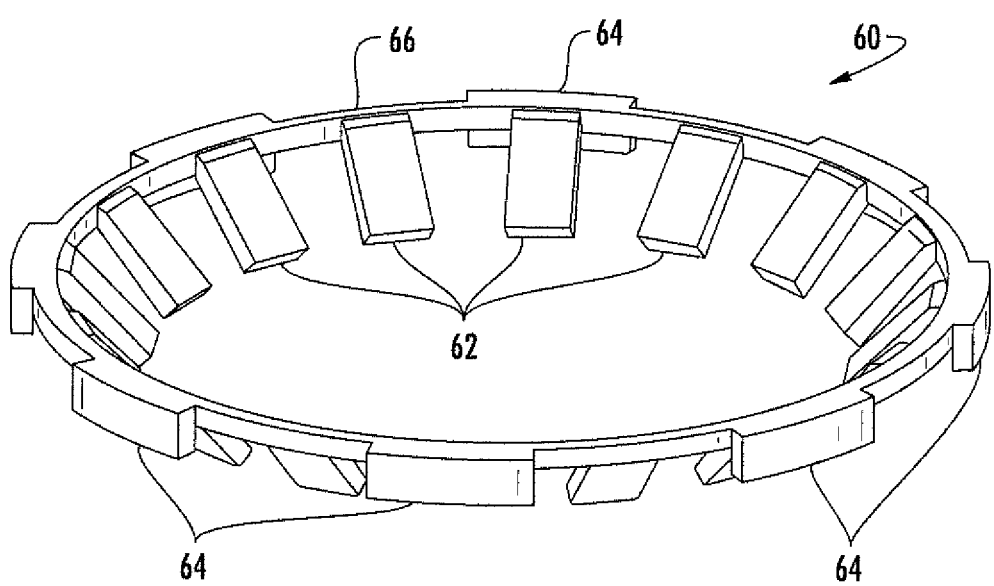
FIG. 5 is an enlarged perspective view of the grab ring shown in FIGS. 1-4.

Referring initially to FIG. 1, there is shown a push-to-connect cartridge 20 for use with a plumbing fitting 10, such as seen in the example of FIG. 2, for coupling a pair of conduits 12 and 14 to each other using the push-to-connect fitting 10. Fitting 10 can be any type of plumbing fitting, such as an elbow, a T, a valve, a reducing fitting, an adapter, or the like. The cartridge 20 can be used with any of these fittings. The cartridge 20, such as shown in FIG. 1, is used at each of the ends of the fitting 10 (shown as 20 and 20' in FIG. 2) with the fitting 10 comprising an in-line coupling having a body 11 with a pair of sockets 13 and 15 at opposite ends. Each socket has an annular shoulder 16 for engagement by a ring seal 80 of the cartridges 20, 20', as also seen in FIGS. 1, 3, and 4. Once the cartridges 20, 20' have been inserted into the sockets 13, 15, the ends 18 of the fitting 10 are crimped over to complete the installation of the cartridges 20, 20' into the fitting 10. Fitting 10 is typically made of a ductile material, such as a copper alloy, which allows ends 18 to be roll-formed, crimped, or otherwise deformed to hold the cartridges 20, 20' in sealed engagement within the plumbing fitting 10. Conduits 12 and 14 can then be inserted into the fitting 10 with ends engaging a dimple-like stop 19 to assure the full, locked insertion and sealing of the fluid conduits 12 and 14 in the fitting 10.

Cartridge 20 comprises, as best seen in FIGS. 3 and 4, a clam shell design including a first semi-cylindrical cartridge half 30 and a second mating semi-cylindrical cartridge half 40. Each cartridge half includes a centered semi-annular groove 32 and 42, respectively, for receiving and holding grab ring 60 when assembled. Communicating with the annular grooves 32 and 42 are radially extending annularly spaced slots 34, 44, respectively, which receive spaced-apart tabs 64 extending outwardly on grab ring 60 to further assist in captively holding the grab ring 60 within the cartridge 20 (FIG. 1) when cartridge halves 30 and 40 are assembled. Cartridge halves 30 and 40 further include interlocking tabs 36 and slots 46, respectively, which mate to interlock the cartridges halves when assembled, as best seen in FIG. 1. The cartridge halves 30 and 40 each also include a beveled surface 31 and 41 (FIG. 4), which conforms to the angle of downwardly and inwardly projecting tines 62 of grab ring 60 in spaced relationship thereto, as best seen in FIG. 2, to allow the tabs 72 of a release ring 70 to deflect the tines 62 of grab ring 60 outwardly and away from conduits 12 and 14 when a release ring 70 is pushed inwardly toward the center of fitting 10.

Cartridge halves 30 and 40 further include an annular shoulder 38 and 48 (FIG. 4), respectively, which lockably engage the shoulders 78 on the resilient tapered tabs 72 of a release ring 70. The annular spaced-apart tabs 72 are flexible by virtue of the annularly spaced slots 74 formed in the cylindrical body 75 of ring 70. This allows the tabs to deflect inwardly during the assembly of release ring 70 to the cartridge 20. Cartridge halves 30 and 40 also include downwardly projecting tabs 39 and 49, respectively, which engage blind apertures 89 in a washer-shaped ring seal 80 to hold the seal to the cartridge 20, as seen in FIG. 1.

Cartridge 20 is assembled in a clam shell type design with semi-cylindrical cartridge halves 30 and 40 inserted around the grab ring 60 with the tabs 64 of ring 60 extending radially outwardly through slots 34 and 44 in the cartridge halves 30 and 40, respectively. The ring-like body 66 of grab ring 60 extends into grooves 32, 42 with the tabs 64 extending through radially extending slots 34 and 44. The mating interlocking tabs 36 and slots 46 of cartridge halves 30, 40, respectively, complete the assembly of the cartridge 20 to the grab ring 60. Ring seal 80 can then be inserted onto the tabs 39 and 49 of the cartridge 20 and the release ring 70 inserted through the open top end of the cartridge (as seen in FIG. 1). The annular shoulder 76 of release ring 70 extends over the annular upper surface 26 of cartridge 20 in spaced relationship thereto, as shown in FIG. 1. This positions the tapered tabs 72 of the release ring 70 in spaced relationship to the tines 62 of the grab ring 60 and sufficient space between the lower surface of shoulder 76 and the upper annular surface 26 of cartridge 20 to allow the release ring 70 to be pushed inwardly toward the center of fitting 10 to deflect tines 62 outwardly, releasing their grip on the conduit 12 or 14 if it is desired to remove a fluid conduit from the push-to-connect coupling.

Cartridge halves 30 and 40 are integrally molded of suitable polymeric material, such as polyoxymethylene (POM), polyphenylsulfone (PPSU), or the like, as is the release ring 70. The grab ring 60 is typically made of a noncorrosive spring steel material, such as stainless steel. The elastomeric relatively flat ring seal 80 is made of a suitable elastomeric material and includes an annular inwardly extending groove 82 allowing its compression against shoulder 16 of the plumbing fitting socket 13 or 15, as illustrated in FIG. 2, with its outer surface 84 engaging inner cylindrical surfaces of sockets 13 and 15. This seals the cartridge 20 to the fitting 10 while the inner edges 86 of seal 80 engage the outer cylindrical surface of conduits 12 or 14 to seal the connection between these fluid conduits and the fitting 10. Thus, the ring seal 80 seals both the cartridge 20 to the fitting 10 and the conduits 12, 14 to the cartridge 20.

It will become apparent to those skilled in the art that various modifications to the preferred embodiment of the invention as described herein can be made without departing from the spirit or scope of the invention as defined by the appended claims.

The invention claimed is:

1. A cartridge for inserting into a plumbing fitting to allow a push-to-connect coupling of a fluid conduit to said fitting, said cartridge comprising:
   a generally cylindrical cartridge defined by a pair of mating semi-cylindrical sections, each section having a side wall with an internal annular groove, said cartridge shaped to fit within a plumbing fitting; and
   a grab ring positioned within said cartridge and having inwardly projecting annularly spaced tines for gripping and holding a fluid conduit inserted into said cartridge past said grab ring, said grab ring extending into said annular grooves of said cartridge sections for holding said grab ring in position between said sections of said cartridge, wherein said cartridge further includes radially extending apertures extending through said side walls of said cartridge sections, and said grab ring includes outwardly extending tabs extending into said apertures of said cartridge.

2. The cartridge as defined in claim 1 and further including a ring seal engaging said cartridge in a position to seat against an inner surface of a plumbing fitting when said cartridge is positioned in said plumbing fitting.

3. A cartridge for inserting into a plumbing fitting to allow a push-to-connect coupling of a fluid conduit to said fitting, said cartridge comprising:
   a generally cylindrical cartridge defined by a pair of mating semi-cylindrical sections and having a side wall with an internal annular groove;
   a grab ring having inwardly projecting annularly spaced tines for gripping and holding a fluid conduit inserted into said cartridge past said grab ring, said grab ring extending into said annular groove of said cartridge for holding said grab ring in position between said sections of said cartridge, wherein said cartridge further includes radially extending apertures extending through said side wall, and said grab ring includes outwardly extending tabs extending into said aperture of said cartridge;
   a ring seal engaging said cartridge in a position to seat against an inner surface of a plumbing fitting when said cartridge is positioned in said plumbing fitting; and
   a release ring inserted into said cylindrical cartridge for selectively engaging said tines of said grab ring.

4. The cartridge as defined in claim 3 wherein said cylindrical cartridge includes an inwardly projecting shoulder and said release ring includes a plurality of tabs with outwardly projecting shoulders that engage said shoulder of said cylindrical cartridge.

5. The cartridge as defined in claim 4 wherein said cylindrical cartridge includes downwardly projecting tabs and said ring seal includes apertures for receiving said tabs, such that said ring seal can be secured to said cylindrical cartridge.

6. The cartridge as defined in claim 5 wherein said cylindrical cartridge and said release ring are made of a polymeric material.

7. The cartridge as defined in claim 6 wherein said grab ring is made of stainless steel.

8. A push-to-connect fluid fitting comprising:
   a housing for receiving a fluid conduit, said housing having an internal annular shoulder and made of a ductile material;
   a generally cylindrical cartridge having a side wall with an internal annular groove and radially spaced apertures extending through said side wall, said cartridge defined by a pair of mating semi-cylindrical sections which fit within said housing;
   a grab ring having outwardly extending tabs and inwardly projecting annularly spaced tines for gripping and holding a fluid conduit inserted into said cartridge past said grab ring, said tabs of said grab ring extending into said apertures of said cartridge sections for holding said grab ring in position between said sections of said cartridge; and
   a ring seal engaging said cartridge in a position to seat against said shoulder of said housing when said cartridge is positioned in said housing.

9. The push-to-connect fluid fitting as defined in claim 8 wherein said cylindrical cartridge includes downwardly projecting tabs and said ring seal includes apertures for receiving said tabs such that said ring seal can be secured to said cylindrical cartridge.

10. A push-to-connect fluid fitting comprising:
- a housing for receiving a fluid conduit, said housing having an internal annular shoulder and made of a ductile material;
- a generally cylindrical cartridge having a side wall with an internal annular groove and radially spaced apertures extending through said side wall, said cartridge defined by a pair of mating semi-cylindrical sections;
- a grab ring having outwardly extending tabs and inwardly projecting annularly spaced tines for gripping and holding a fluid conduit inserted into said cartridge past said grab ring, said tabs of said grab ring extending into said apertures of said cartridge for holding said grab ring in position between said sections of said cartridge; and
- a ring seal engaging said cartridge in a position to seat against said shoulder of said housing when said cartridge is positioned in said housing, wherein said cylindrical cartridge includes downwardly projecting tabs and said ring seal includes apertures for receiving said tabs such that said ring seal can be secured to said cylindrical cartridge; and
- a release ring inserted into said cylindrical cartridge for selectively engaging said tines of said grab ring.

11. The push-to-connect fluid fitting as defined in claim 10 wherein said cylindrical cartridge includes an inwardly projecting shoulder and said release ring includes a plurality of tabs with outwardly projecting shoulders that engage said shoulder of said cylindrical cartridge.

12. The push-to-connect fitting as defined in claim 11 wherein said cylindrical cartridge and said release ring are made of a polymeric material.

13. The push-to-connect fitting as defined in claim 12 wherein said grab ring is made of stainless steel.

14. A cartridge and plumbing fitting to allow a push-to-connect coupling of a fluid conduit to said fitting, said cartridge comprising:
- a plumbing fitting for receiving a fluid conduit, said fitting including a socket with an internal annular shoulder;
- a generally cylindrical cartridge defined by a pair of mating semi-cylindrical sections and having a side wall with an internal annular groove, said cartridge positioned in sealable engagement within said socket, said semi-cylindrical sections including interlocking tabs and slots; and
- a grab ring having inwardly projecting annularly spaced tines for gripping and holding a fluid conduit inserted into said cartridge past said grab ring, said grab ring extending into said annular groove of said cartridge for holding said grab ring in position between said sections of said cartridge.

15. The cartridge and plumbing fitting as defined in claim 14 wherein said cartridge further includes radially extending apertures extending through said side wall, and said grab ring includes outwardly extending tabs extending into said apertures of said cartridge for holding said grab ring in position within said cartridge sections.

16. A cartridge and plumbing fitting to allow a push-to-connect coupling of a fluid conduit to said fitting, said cartridge comprising:
- a plumbing fitting for receiving a fluid conduit, said fitting including a socket with an internal annular shoulder;
- a generally cylindrical cartridge defined by a pair of mating semi-cylindrical sections and having a side wall with an internal annular groove, said cartridge positioned in sealable engagement in said socket;
- a grab ring having inwardly projecting annularly spaced tines for gripping and holding a fluid conduit inserted into said cartridge past said grab ring, said grab ring extending into said annular groove of said cartridge for holding said grab ring in position between said sections of said cartridge, wherein said cartridge further includes radially extending apertures extending through said side wall, and said grab ring includes outwardly extending tabs extending into said aperture of said cartridge; and
- a ring seal engaging said cartridge in a position to seat against said annular shoulder of said socket when said cartridge is positioned in said plumbing fitting.

17. The cartridge and plumbing fitting as defined in claim 16 wherein said cylindrical cartridge includes downwardly projecting tabs and said ring seal includes apertures for receiving said tabs, such that said ring seal can be secured to said cylindrical cartridge.

18. The cartridge and plumbing fitting as defined in claim 17 and further including a release ring inserted into said cylindrical cartridge for selectively engaging said tines of said grab ring.

19. The cartridge and plumbing fitting as defined in claim 18 wherein said cylindrical cartridge includes an inwardly projecting shoulder and said release ring includes a plurality of tabs with outwardly projecting shoulders that engage said shoulder of said cylindrical cartridge.

\* \* \* \* \*